A. J. NUTTER.
REFRIGERATOR LINING.
APPLICATION FILED MAR. 20, 1908.
907,276.
Patented Dec. 22, 1908.
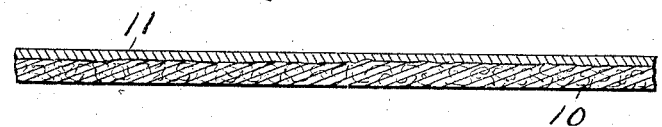
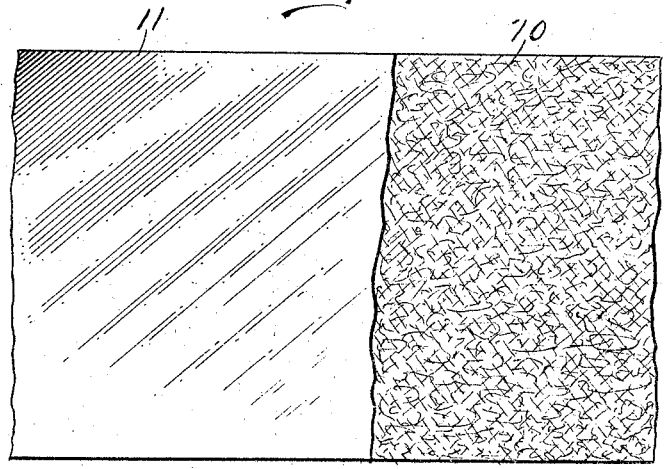
Witnesses
J. M. Fowler Jr.
L. L. Morrill.
Inventor
Alonzo J. Nutter,
By Mason Fenwick & Lawrence,
his Attorneys

UNITED STATES PATENT OFFICE.

ALONZO JAMES NUTTER, OF KANSAS CITY, MISSOURI.

REFRIGERATOR-LINING.

No. 907,276.  Specification of Letters Patent.  Patented Dec. 22, 1908.

Application filed March 20, 1908. Serial No. 422,280.

*To all whom it may concern:*

Be it known that I, ALONZO JAMES NUTTER, a citizen of the United States, residing at Kansas City, in the county of Jackson and State of Missouri, have invented certain new and useful Improvements in Refrigerator-Linings; and I do hereby declare the following to be a full, clear, and exact description of the invention, such as will enable others skilled in the art to which it appertains to make and use the same.

My improvements relate to refrigerator linings whose surfaces line the interior of food containing and other compartments of refrigerators.

The object of my improved refrigerator lining is to furnish a lining which is strong, able to withstand all extremes of temperature, insect and vermin proof, able to resist the action of water, which is a non-conductor of heat, which is economical to produce and which at the same time is highly ornamental.

I produce such a lining in the following manner:

Figure 1 is a view in section perpendicular to the surface showing in exaggerated relation the insulating board and coating. Fig. 2 is a view partly in plan and partly with the coating broken away showing at one point the coating and at another point the base upon which the coating is carried.

As the basis for my lining I take asbestos board 10 which is a composition made of asbestos fiber and cement and produce on one side of said board a smooth, water proof and highly polished surface. This surface may be produced by means of a baking japan represented at 11 but of course exaggerated or by means of a baking enamel as hereinafter described.

Where a baking japan is used a filler is first applied to the surface of the asbestos board so as to fill the pores of the surface of the asbestos board and so as to receive the japan. After the filler has been applied the asbestos board is painted with the liquid japan in the ordinary manner. After the japan has dried the asbestos board is baked in a japanning oven until the japanning is completed leaving a beautiful, smooth and water proof surface on the asbestos board.

When it is desired to produce a hard and more enduring finish on the surface of the asbestos board, a glass like enamel is applied to the surface of the asbestos board and afterwards fused thereon by the application of great heat in the enameling furnace. I do not limit myself to any particular composition of enamel to be used but any of the ordinary enamels applicable in enameling metals or pottery are applicable to enameling asbestos board. The enamel is first applied in the rough state by painting, brushing or otherwise applying same and is then fused on to the surface of the asbestos board by the application of heat. The enamels used comprise compositions containing silicates of potassium, sodium, calcium, magnesium and lead, borates and the other elements present in ordinary glass like enamels. Their composition may be varied from time to time as an enamel of high or low fusing point is wanted. This glass like enamel on fusing adheres very tenaciously to the surface of the asbestos board as the composition of the enamel approximates greatly the composition of asbestos board, the asbestos board being composed of asbestos and cement consists largely of silicates having a composition approximate to that of the composition of the enamel so that the co-efficient of expansion of the enamel and of the asbestos board are very near together so that the enamel adheres very tenaciously to the asbestos board being practically fused into one solid piece therewith, so that no changes of temperature are able to effect the union of the enamel and the asbestos board. This enamel forms a glass like surface on the surface of the board rendering same water proof and of a smooth, even surface.

I do not limit myself to asbestos board of any particular composition as the lining herein mentioned can be made with any form of mineral board.

What I claim is:

1. In a lining, the combination of an enamel and asbestos board.

2. In a lining, the combination of asbestos board and a japanning enamel baked thereon.

3. In a lining, the combination of a composition of asbestos and cement and an enamel.

4. In a refrigerator lining, the combination of a composition of asbestos fiber and cement and an enamel baked thereon.

In testimony whereof I affix my signature in presence of two witnesses.

ALONZO JAMES NUTTER.

Witnesses:
S. G. LOEWENTHAL,
EMMA M. WILLOCK.